US012649827B2

(12) United States Patent
Wang et al.

(10) Patent No.: US 12,649,827 B2

(45) **Date of Patent: *Jun. 9, 2026**

(54) POLYDIORGANOSILOXANE PREPARATION

(71) Applicant: DOW SILICONES CORPORATION, Midland, MI (US)

(72) Inventors: Xiuyan Wang, Shanghai (CN); Jiang Peng, Shanghai (CN); Yi Guo, Shanghai (CN); Qiang Hu, Shanghai (CN); Michael H. Wang, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 571 days.

This patent is subject to a terminal disclaimer.

(21) Appl. No.: 18/023,714

(22) PCT Filed: Aug. 31, 2020

(86) PCT No.: PCT/CN2020/112411

§ 371 (c)(1),
(2) Date: Feb. 27, 2023

(87) PCT Pub. No.: WO2022/041180

PCT Pub. Date: Mar. 3, 2022

(65) Prior Publication Data

US 2023/0323034 A1 Oct. 12, 2023

(51) Int. Cl.

| | |
|---|---|
| ***C08G 77/08*** | (2006.01) |
| ***C08G 77/06*** | (2006.01) |
| ***C08G 77/18*** | (2006.01) |
| ***C08G 77/38*** | (2006.01) |
| ***C08K 5/09*** | (2006.01) |
| ***C08K 5/5419*** | (2006.01) |
| ***C08L 83/04*** | (2006.01) |

(52) U.S. Cl.

CPC ............. *C08G 77/08* (2013.01); *C08G 77/06* (2013.01); *C08G 77/18* (2013.01); *C08G 77/38* (2013.01); *C08K 5/09* (2013.01); *C08K 5/5419* (2013.01); *C08L 83/04* (2013.01); *C08G 2190/00* (2013.01)

(58) Field of Classification Search

CPC ....................................................... C08G 77/18

See application file for complete search history.

(56) References Cited

U.S. PATENT DOCUMENTS

| | | | | |
|---|---|---|---|---|
| 3,542,901 A * | 11/1970 | Cooper | C08L 83/04 528/33 |
| 3,996,184 A | 12/1976 | Klosowski | |
| 4,417,042 A * | 11/1983 | Dziark | C08K 5/54 528/901 |
| 4,472,551 A | 9/1984 | White et al. | |
| 4,495,331 A | 1/1985 | Chung | |
| 4,515,932 A | 5/1985 | Chung | |
| 4,517,352 A | 5/1985 | White et al. | |
| 5,017,628 A | 5/1991 | Dietlein | |
| 5,300,608 A * | 4/1994 | Chu | C08G 77/20 556/466 |
| 5,310,844 A * | 5/1994 | Weber | C08G 77/18 556/467 |
| 2005/0192387 A1 | 9/2005 | Williams et al. | |
| 2007/0123640 A1 | 5/2007 | Cross et al. | |
| 2010/0099793 A1 | 4/2010 | Wunder | |
| 2011/0046299 A1* | 2/2011 | Maliverney | C07F 7/1804 524/588 |
| 2012/0172473 A1 | 7/2012 | Maliverney | |
| 2016/0369061 A1* | 12/2016 | Dinkar | C08G 77/08 |
| 2018/0171082 A1 | 6/2018 | Cannas et al. | |
| 2018/0194902 A1 | 7/2018 | Prasse et al. | |
| 2020/0079911 A1 | 3/2020 | Ganachaud et al. | |
| 2021/0179904 A1 | 6/2021 | Friedel et al. | |
| 2022/0162393 A1* | 5/2022 | Uta | C08K 5/5445 |
| 2023/0272168 A1* | 8/2023 | Seitz | C08L 83/06 528/21 |

FOREIGN PATENT DOCUMENTS

| | | |
|---|---|---|
| CN | 1926194 A | 3/2007 |
| CN | 101998960 A | 3/2011 |
| CN | 107428941 A | 12/2017 |
| CN | 108350172 A | 7/2018 |
| EP | 0361803 A2 | 4/1990 |

(Continued)

OTHER PUBLICATIONS

International Search Report for PCT/CN2020/112411 dated May 21, 2021, 3 pages.

Wacker, "HDK V15 Pyrogenic Silica—Synthetic, hydrophilic, amorphous silica, produced via flame hydrolysis. Standard product for industrial applications", Jun. 28, 2022.

International Search Report for PCT/US2021/039298 dated Oct. 20, 2021, 3 pages.

International Search Report for PCT/US2021/039299 dated Oct. 28, 2021, 4 pages.

*Primary Examiner* — Marc S Zimmer

(74) *Attorney, Agent, or Firm* — Warner Norcross + Judd LLP

(57) ABSTRACT

A process for end-capping a dimethylsilanol terminated polydiorganosiloxane with one or more di, tri and/or tetra alkoxysilanes in the presence of a basic end-capping catalyst starting material is provided. An acidic stabilizing/neutralising agent is subsequently added. The acidic stabilizing/neutralising agent is selected from one or more fatty acids having from 8 to 26 carbons; an alkane sulphonic acid having from 1 to 10 carbons; acidic fumed silica and/or one or more acidic liquid polybutadienes or a mixture thereof. The resulting capped polymeric material may be utilized as a polymer in, e.g., an organopolysiloxane elastomer composition.

20 Claims, No Drawings

(56) References Cited

FOREIGN PATENT DOCUMENTS

| | | | |
|---|---|---|---|
| EP | 0802233 | B1 | 2/2004 |
| EP | 2106418 | A1 | 10/2009 |
| WO | 2008005293 | A1 | 1/2008 |
| WO | 2008153983 | A1 | 12/2008 |
| WO | 2013106193 | A1 | 7/2013 |
| WO | 2017036892 | A1 | 3/2017 |
| WO | 2019200579 | A1 | 10/2019 |
| WO | 2020039057 | A1 | 2/2020 |

* cited by examiner

POLYDIORGANOSILOXANE PREPARATION

CROSS-REFERENCE TO RELATED APPLICATIONS

This application is the U.S. National Stage of and claims priority to International Application No. PCT/CN2020/112411 filed on 31 Aug. 2020, the content of which is incorporated herein by reference.

This relates to a process for the preparation of alkoxy end-capped diorganopolysiloxanes, prepared by end-capping silanol terminated polydiorganosiloxanes which diorganopolysiloxanes having alkoxy end groups can be stabilized for extended periods of several months. This invention also relates to the use of alkoxy end-capped polydiorganosiloxanes as one of the essential constituents of organopolysiloxane elastomer compositions which are stable in storage, in the absence of moisture, and which are cross-linked by atmospheric moisture at ambient temperature.

Several routes are known in the art for the preparation of diorganopolysiloxane polymers having alkoxy end groups. It is known in the art that diorganopolysiloxane polymers having alkoxy end groups may be prepared by reacting di-, tri- or tetra alkoxy silanes (poly alkoxysilanes) with silanol terminated diorganopolysiloxane polymers in the presence of an end-capping catalyst.

The reaction is not as straightforward as might be anticipated. In fact, silanol groups do not readily react with alkoxysilane groups at ambient temperatures in the absence of end-capping catalyst. A wide variety of compounds have been proposed as suitable catalysts for this purpose. Some, e.g. sulphuric acid, hydrochloric acid, Lewis acids, sodium hydroxide, potassium hydroxide and tetramethylammonium hydroxide are chemically severe and when involved in the condensation of silanols with alkoxy silanes have been found to cause bond scission and random rearrangement. Other compounds which have been proposed as suitable end-capping catalysts including amines, inorganic oxides, potassium acetate, titanium/amine combinations, carboxylic acid/amine combinations, alkoxyaluminium chelates, N,N'-disubstituted hydroxylamines, carbamates, metal hydroxides such as lithium hydroxide and oxime-containing organic compounds are undesired for a variety of reasons. For example, amine catalyst systems are slow, particularly given the level of reactivity of many of the alkoxysilanes involved in the process. In addition, amine and carboxylic acid catalysts are corrosive and require special handling and removal processes once the reaction has proceeded to the desired state of completion. Lithium hydroxide, being an inorganic solid, requires a polar solvent such as methanol to introduce it as a solution into the reaction. However, the presence of methanol leads to a continual regeneration of the catalyst e.g. in the form of lithium methoxide and consequently, the resultant polymer product exhibits a rapid lowering of viscosity due to interaction with said regenerated lithium catalyst. Furthermore, many of these catalysts can release displeasing odours and are dangerous to eyes and skin, and their removal is often difficult, requiring extra steps which are laborious and costly.

Organic titanium catalysts such as titanium tetra isoproprionate have been previously considered for use as end-capping catalysts for the preparation of alkoxy end-capped polydiorganosiloxane polymers but they form complexes with the silanol terminated polydiorganosiloxane starting materials which leads to significant thickening of the polymer matrix. Whilst this titanium-silicon complexing is reversible, it requires high shear mixing to breakdown the thick phase which is undesirable for industry because of the additional cost and time required.

Additionally, the inability to remove end-capping catalysts can be detrimental to the storage stability of the polymer reaction product or compositions containing the polymer, because of e.g. gelling due to cross-linking or polymer growth or polymer chain scission (sometimes referred to as pre-cure reversion). Furthermore, the inability to remove some of the amine end-capping catalysts completely may lead to discolouration either during storage of the polymer reaction product or of subsequently prepared sealant, adhesive, caulk compositions and the like and/or their respective elastomeric products upon cure.

Hence, a need remains for a process for making viscosity-stable alkoxy-terminated polydiorganosiloxane polymers by end-capping silanol-terminated polydiorganosiloxanes using an end-capping catalyst which does not suffer from the disadvantages of the prior art s.

There is provided herein a process for preparing an alkoxy-terminated polydiorganosiloxane from a silanol-terminated polydiorganosiloxane starting material comprising:—

Step (i) reacting said silanol terminated polydiorganosiloxane starting material with one or more polyalkoxy silane starting material(s) of the structure $$(R^2\text{—}O)_{(4-b)}\text{—}Si\text{—}R^1_b$$

where b is 0, 1 or 2, $R^2$ is an alkyl group which may be linear or branched having from 1 to 15 carbons and $R^1$ may be any suitable group i.e. a monovalent hydrocarbon radical such as $R^2$, cycloalkyl groups; alkenyl groups, aryl groups; aralkyl groups aminoalkyl groups, (meth)acrylate groups, glycidyl ether groups and groups obtained by replacing all or part of the hydrogen in the preceding organic groups with halogen;

in the presence of a basic end-capping catalyst starting material; and subsequent to step (i)

step (ii) adding an acidic stabilizing/neutralising agent selected from one or more fatty acids having from 8 to 26 carbons;
an alkane sulphonic acid having from 1 to 10 carbons;
acidic fumed silica and/or
one or more acidic liquid polybutadienes or a mixture thereof.

There is also provided herein an alkoxy end-capped, polydiorganosiloxane polymer obtainable or obtained by:

Step (i) reacting a silanol terminated polydiorganosiloxane starting material with one or more polyalkoxy silane starting material(s) of the structure $$(R^2\text{—}O)_{(4-b)}\text{—}Si\text{—}R^1_b$$

where b is 0, 1 or 2, $R^2$ is an alkyl group which may be linear or branched having from 1 to 15 carbons and $R^1$ may be any suitable group i.e. a monovalent hydrocarbon radical such as $R^2$, cycloalkyl groups; alkenyl groups, aryl groups; aralkyl groups aminoalkyl groups, (meth)acrylate groups, glycidylether groups and groups obtained by replacing all or part of the hydrogen in the preceding organic groups with halogen;

in the presence of a basic end-capping catalyst starting material(s); and subsequent to step (i)

step (ii) adding an acidic stabilizing/neutralising agent selected from one or more fatty acids having from 8 to 26 carbons,
an alkane sulphonic acid having from 1 to 10 carbons,
acidic fumed silica and/or one or more
acidic liquid polybutadienes or a mixture thereof.

There is also provided herein a process for preparing an alkoxy end-capped, polydiorganosiloxane from a silanol-terminated polydiorganosiloxane as described above and then preparing an organopolysiloxane elastomer composition, by mixing the following components together:

(a) said alkoxy end-capped, polydiorganosiloxane polymer obtained by way of the process described herein
(b) filler;
(d) a condensation catalyst; and optionally
(e) adhesion promoter and/or
(c) a cross-linker.

There is also provided the use of an alkoxy end-capped, polydiorganosiloxane polymer prepared by way of the process described herein as a polymer in the preparation of an organopolysiloxane elastomer composition.

The silanol terminated polydiorganosiloxane starting material has at least two silanol groups per molecule and may have the formula:

$$(HO)_{3-n}R_nSi—(Z)_d—(O)_q—(R_ySiO_{(4-y)/2})_z—(SiR_2-Z)_d—Si—R_n(OH)_{3-n} \quad (1)$$

in which each R is an alkyl, alkenyl or aryl group, and Z is a divalent organic group;

d is 0 or 1, q is 0 or 1 and d+q=1; n is 0, 1 or 2, y is 0, 1 or 2, and z is an integer such that said organopolysiloxane polymer starting material has a viscosity of from 1,000 to 100,000 mPa·s at 25° C., alternatively from 5,000 to 90,000 mPa·s at 25° C., measured using a Brookfield® rotational viscometer with spindle LV-4 (designed for viscosities in the range between 1,000-2,000,000 mPa·s) and adapting the speed according to the polymer viscosity.

Typically in the above d is 0, q is 1 and n is 1 or 2, alternatively n is 2. In such a case the silanol terminated polydiorganosiloxane starting material has the following structure:

$$(HO)_{3-n}R_nSi—O—(R_ySiO_{(4-y)/2})_z—Si—R_n(OH)_{3-n}$$

With R, y and z being as described above, the average value of y is about 2, i.e. the silanol terminated polymer is substantially (i.e. greater than (>) 90% linear, alternatively >97% linear).

Each R is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, substituted aliphatic organic groups such as 3,3,3-trifluoropropyl groups aminoalkyl groups, polyaminoalkyl groups, and/or epoxyalkyl groups.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms. Each alkylene group may for example be individually selected from an ethylene, propylene, butylene, pentylene and/or hexylene group. However, as previously indicated in the present instance d is usually 0 (zero).

The silanol terminated polydiorganosiloxane starting material has a viscosity of from viscosity of from 1,000 to 100,000 mPa·s at 25° C., alternatively from 5,000 to 90,000 mPa·s at 25° C., measured using a Brookfield® rotational viscometer with spindle LV-4 (designed for viscosities in the range between 1,000-2,000,000 mPa·s) and adapting the speed according to the polymer viscosity, such that z is therefore an integer enabling such a viscosity, alternatively z is an integer from 200 to 5000.

The silanol terminated polydiorganosiloxane starting material can be a single siloxane represented by Formula (1) or it can be mixtures of polydiorganosiloxane polymers represented by the aforesaid formula. Hence, the term "siloxane polymer mixture" in respect to the silanol terminated polydiorganosiloxane starting material is meant to include any individual polydiorganosiloxane polymer starting material or mixtures of polydiorganosiloxane polymer starting materials.

The Degree of Polymerization (DP), (i.e. in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity.

In step (i) of the process the silanol terminated polydiorganosiloxane starting material described above is reacted with one or more polyalkoxy silane starting material(s) of the structure $$(R^2—O)_{(4-b)}—Si—R^1_b$$

where b is 0, 1 or 2, alternatively 0 or 1; $R^2$ is an alkyl group having from 1 to 15 carbons alternatively from 1 to 10 carbons, alternatively from 1 to 6 carbons and may be linear or branched, for example methyl, ethyl, propyl, n-butyl, t-butyl, pentyl and hexyl, alternatively methyl or ethyl, alternatively $R^2$ may be a methyl group. $R^1$ may be any suitable group i.e. a monovalent hydrocarbon radical such as $R^2$ which may be substituted or unsubstituted e.g. substituted by halogen such as fluorine and chlorine e.g. trifluoropropyl and/or perfluoropropyl; cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. In one embodiment $R^1$ may be a vinyl, methyl or ethyl, group, alternatively a vinyl or methyl group alternatively a methyl group. When b is 0 or 1 this means that the polyalkoxysilane has either 4 or 3 alkoxy groups. Typically, the silanol terminated polydiorganosiloxane starting material has one terminal silanol bond (—Si—OH) per terminal silicon, in such a case the end-capping reaction will generate terminal groups replacing the (—Si—OH) including 3 Si-alkoxy bonds or two Si-alkoxy bonds and e.g. an alkyl or vinyl or the like.

Typically the amount of polyalkoxy silane starting material(s) present in the starting materials for the end-capping reaction is determined so that there is at least an equimolar amount of polyalkoxy silane present relative to the amount of —OH groups on the polymer. Hence, the greater the viscosity/chain length of the polymer used as a starting material, typically the less —OH groups present in the polymer and consequently less polyalkoxy silane is required. Equally the opposite is correct i.e. the smaller the viscosity/chain length of the polymer used as a starting material, typically the greater the number of —OH groups present in the polymer starting material and consequently a greater amount of polyalkoxy silane is required. However, in some instances there is a preference to include a significant molar excess of polyalkoxy silane and the remaining unreacted polyalkoxy silane present at the end of the end-capping reaction i.e. in the alkoxy end-capped, polydiorganosiloxane polymer reaction end-product is then utilised as a cross-linker if/when the alkoxy end-capped, polydiorganosiloxane polymer reaction end-product is used as an ingredient in an organopolysiloxane elastomer composition for use as e.g. a silicone sealant composition. Hence, in one embodiment herein preferably there is a molar excess of polyalkoxy silane with respect to —OH groups on the polymer being end-capped.

The end-capping catalyst starting material utilised in accordance with the disclosure herein may be any suitable basic catalyst which catalyses the alkoxy end-capping reaction. Such suitable basic catalyst include for the sake of example tetramethylammonium hydroxide amines, basic inorganic oxides, titanium/amine combinations, carboxylic acid/amine combinations, N,N'-disubstituted hydroxylamines, carbamates, metal hydroxides such as sodium hydroxide, potassium hydroxide, lithium hydroxide and oxime-containing organic compounds. However, one particularly preferred groups of basic catalysts are one or more linear, branched or cyclic molecules comprising one or more groups selected from amidine groups, guanidine groups, derivatives of said amidine groups and/or guanidine groups or a mixture thereof.

The amidine or guanidine group may comprise linear, branched or cyclic silicon containing molecules or linear, branched or cyclic organic molecules containing one or more of the groups (1) to (4) depicted below.

(1)

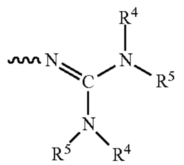

(2)

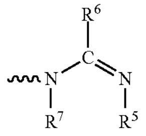

(3)

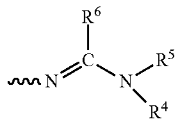

-continued (4)

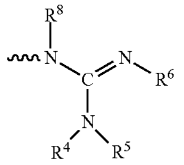

Wherein each $R^4$, $R^5$, $R^6$, $R^7$ and $R^8$ may be the same or different and may be selected from hydrogen, an alkyl group, a cycloalkyl group, a phenyl group, an aralkyl group or alternatively $R^4$ and $R^5$ or $R^6$ and $R^5$ or $R^7$ and $R^5$ or $R^8$ and $R^4$ may optionally form ring structure, for example they may form a heterogeneously substituted alkylene group to create a ring structure, wherein the heterogeneous substitution is by means of an oxygen or nitrogen atom.

In one embodiment formulas (1) to (4) may be part of a silane structure where the nitrogen is bonded to a silicon atom via an alkylene group, e.g.—

$$(R^{10})_3Si—Z\text{-}A$$

wherein Z is as hereinbefore described, each $R^{10}$ may be the same or different and may be a hydroxyl and/or hydrolysable group (such as those described in relation to cross-linker (c) later in the description), an alkyl group; a cycloalkyl group; alkenyl group, aryl group or an aralkyl group; and A is one of (1) to (4) above.

In a further alternative any one of structures (1) to (4) above may be linked to a polymer radical selected from a group consisting of alkyd resins, oil-modified alkyd resins, saturated or unsaturated polyesters, natural oils, epoxides, polyamides, polycarbonates, polyethylenes, polypropylenes, polybutylenes, polystyrenes, ethylene-propylene copolymers, (meth)acrylates, (meth)acrylamides and salts thereof, phenolic resins, polyoxymethylene homopolymers and copolymers, polyurethanes, polysulphones, polysulphide rubbers, nitrocelluloses, vinyl butyrates, vinyl polymers, ethylcelluloses, cellulose acetates and/or butyrates, rayon, shellac, waxes, ethylene copolymers, organic rubbers, polysiloxanes, polyethersiloxanes, silicone resins, polyethers, polyetheresters and/or polyether carbonates. If structures (1) to (4) are linked to a siloxane radical they may be bonded to a polysiloxane radical having an average molecular weight in the range of from 206 to 50,000 g/mol, in particular 280 to 25,000 g/mol, particularly preferably 354 to 15,000 g/mol. An end-capping catalyst having such a polysiloxane radical is typically liquid at room temperature, has a low vapor pressure, is particularly readily compatible in curable compositions based on silicone polymers and in this context tends particularly little towards separation or migration.

For example, the end-capping catalyst starting material maybe 1,1,3,3-tetramethylguanidine (TMG) having the structure $(CH_3)_2N—C{=}NH(N(CH_3)_2)$ or may be a silane of the following structure $$(R^2—O)_{(4-a-b)}—Si—R^3_aR^1_b$$

where $R^2$, $R^1$ and b are as described above, a is 1 and $R^3$ is $—Z^1—N{=}C—(NR^5R^4)_2$ in which $R^5$ and $R^4$ are as defined above, $Z^1$ is an alkylene or an oxyalkylene group having from 2 to 6 carbons and a is 1.

Specific examples include, 2-[3-(trimethoxysilyl)propyl]-1,1,3,3-tetramethylguanidine and 2-[3-(methyldimethoxysilyl)propyl]-1,1,3,3-tetramethylguanidine.

Alternatively, the end-capping catalyst may be a cyclic guanidine such as for example, Triazabicyclodecene (1,5,7-Triazabicyclo[4.4.0]dec-5-ene (TBD)) as depicted below:

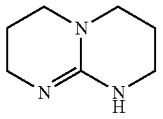

or 7-Methyl-1,5,7-triazabicyclo[4.4.0]dec-5-ene (mTBD) as depicted below

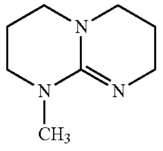

Alternatively, the end-capping catalyst starting material may be a cyclic amidine such as for example, 1,5-Diazabicyclo[4.3.0]non-5-ene (DBN) as depicted below

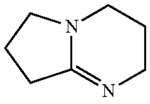

or 1,8-diazabicyclo[5.4.0]undec-7-ene (DBU) as depicted below

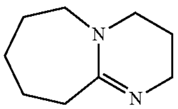 [SMILES: C1CCC2=NCCCN2CC1]

When step (i) of the process can be continuously mixed (e.g., magnetic stir bar or overhead mechanical stirrer), the end-capping catalyst can be added directly as a solid. Furthermore, if the end-capping catalyst can be introduced into the reaction environment in the form of a fine powder a solvent is optional. If the reaction will be mixed and allowed to rest, then the end-capping catalyst is delivered as a solution to ensure homogenous dispersion. When delivered in solution the solvent may be a compatible silicone or organic solvent such as, for the sake of example, trimethyl terminated polydimethylsiloxane or toluene. However, to minimise VOC issues it was found that a preferable liquid for delivery of the end-capping catalyst was, in actual fact, the or one of the poly alkoxysilanes being utilised to end-cap the silanol-terminated polydiorganosiloxane starting material, for example vinyl trimethoxy silane and/or methyl trimethoxy silane.

As previously indicated, upon completion of the end-capping reaction in step (i) an acidic stabilizing/neutralising agent is added to the alkoxy end-capped polydiorganosiloxane polymer reaction end-product. This may be done immediately after step (i) or when being used to produce an organopolysiloxane elastomer compositions during the preparation thereof, e.g. after introduction of filler. Hence, in the former case the alkoxy end-capped polydiorganosiloxane polymer reaction end-product may be the result of step (i) and (ii) but in the latter case it may be considered herein to be the result of step (i) alone. It was determined that in the case of the former the alkoxy end-capped polydiorganosiloxane polymer reaction end-product is stabilised by the addition of the acidic stabilizing/neutralising agent of step (ii) and subsequently the resulting organopolysiloxane elastomer compositions when prepared. However, in the latter case the organopolysiloxane elastomer compositions are stabilised by use of the acidic stabilizing/neutralising agent of step (ii).

The acidic stabilizing/neutralising agent is selected from one or more fatty acids having from 8 to 26 carbons, an alkane sulphonic acid having from 1 to 10 carbons, acidic fumed silica and/or acidic liquid polybutadienes.

The one or more fatty acids may be either saturated or unsaturated fatty acids having from 8 to 26 carbons. Unsaturated fatty acids having from 8 to 26 carbons may include for the sake of example:— myristoleic acid ($CH_3(CH_2)_3CH{=}CH(CH_2)_7COOH$),
palmitoleic acid ($CH_3(CH_2)_5CH{=}CH(CH_2)_7COOH$),
sapienic acid ($CH_3(CH_2)_8CH{=}CH(CH_2)_4COOH$),
oleic acid ($CH_3(CH_2)_7CH{=}CH(CH_2)_7COOH$),
elaidic acid ($CH_3(CH_2)_7CH{=}CH(CH_2)_7COOH$),
vaccenic acid ($CH_3(CH_2)_5CH{=}CH(CH_2)_9COOH$),
linoleic acid ($CH_3(CH_2)_4CH{=}CHCH_2CH{=}CH(CH_2)_7COOH$),
linoelaidic acid ($CH_3(CH_2)_4CH{=}CHCH_2CH{=}CH(CH_2)_7COOH$),
α-linolenic acid ($CH_3CH_2CH{=}CHCH_2CH{=}CHCH_2CH{=}CH(CH_2)_7COOH$),
arachidonic acid $CH_3(CH_2)_4CH{=}CHCH_2CH{=}CHCH_2CH{=}CHCH_2CH{=}CH(CH_2)_3COOH$), eicosapentaenoic acid $CH_3CH_2CH{=}CHCH_2CH{=}CHCH_2CH{=}CHCH_2CH{=}CHCH_2CH{=}CH(CH_2)_3COOH$,
erucic acid ($CH_3(CH_2)_7CH{=}CH(CH_2)_{11}COOH$), and docosahexaenoic acid ($CH_3CH_2CH{=}CHCH_2CH{=}CHCH_2CH{=}CHCH_2CH{=}CHCH_2CH{=}CHCH_2CH{=}CH(CH_2)_2COOH$).

Saturated fatty acids having from 8 to 25 carbons may include for the sake of example:—Caprylic acid ($CH_3(CH_2)_6COOH$), capric acid ($CH_3(CH_2)_8COOH$), lauric acid ($CH_3(CH_2)_{10}COOH$), myristic acid ($CH_3(CH_2)_{12}COOH$), pentadecanoic acid ($CH_3(CH_2)_{13}COOH$), palmitic acid ($CH_3(CH_2)_{14}COOH$), heptadecanoic acid ($CH_3(CH_2)_{15}COOH$), stearic acid ($CH_3(CH_2)_{16}COOH$, arachidic acid ($CH_3(CH_2)_{18}COOH$), behenic acid ($CH_3(CH_2)_{20}COOH$), lignoceric acid ($CH_3(CH_2)_{22}COOH$), crotic acid ($CH_3(CH_2)_{24}COOH$).

The one or more fatty acids may comprise a mixture of any suitable fatty acids such as those listed above.

Alternatively the acidic stabilizing/neutralising agent may be an alkane sulfonic acids having from 1 to 10 carbons, e.g. such as methane sulfonic acid, ethane sulphonic acid, propane sulphonic acid, butane sulphonic acid, pentane sulphonic acid and the like.

Further alternatively, the acidic stabilizing/neutralising agent may be an acidic liquid polybutadiene. The acidic liquid polybutadiene may be any suitable acidic liquid polybutadiene but is preferably a low molecular weight acidic liquid polybutadiene having a mean molar mass of between 2000 and 7500 g/mol using gel permeation chromatography (GPC) based on polystyrene standards. The acidic liquid polybutadiene may consist of any suitable type of polybutadiene chain, for example the acidic liquid polybutadiene may be for the sake of example a 1,4-cis polybutadiene. For example, the acidic liquid polybutadiene may be an anhydride functionalised liquid polybutadiene, e.g. a maleic anhydride functionalised liquid polybutadiene and/or an anhydride functionalised liquid polybutadiene which has succinic anhydride groups distributed along the polymer chains. When present the anhydride groups may be randomly distributed along the polymer chain. An example of the above is POLYVEST® MA 75 a commercially available maleic anhydride functionalised liquid polybutadiene from Evonik. POLYVEST® MA 75 is a maleic anhydride adduct of a low molecular weight 1,4-cis polybutadiene which has succinic anhydride groups randomly distributed along the polymer chains.

A major advantage herein is the ability to cap the polymer whilst maintaining the stability of the polymer viscosity as the process minimises cross-linking or polymer growth. It was found that there was no need to introduce the aforementioned neutralising/stabilizing agent into the composition if the resulting alkoxy end-capped polymer was to be used within a period of seven days from preparation as described above but when the alkoxy end-capped polymer is to be utilised to prepare an organopolysiloxane elastomer composition or the like after a longer period that the aforementioned neutralising/stabilizing agent is able to successfully stabilize the alkoxy end-capped polymer for a several month period. By stability we mean without a significant loss or increase (i.e. a change in viscosity of greater than (>) 10%) of the alkoxy terminated polydiorganosiloxane polymers due to cross-linking or gelling, or alternatively scission or the like. This may be determined by periodic testing of samples by gel permeation chromatography (GPC) or by viscosity measurement using a suitable method, e.g. utilising a suitable viscometer, e.g. a suitable Brookfield rotational viscometer and testing viscosity in accordance with ASTM D 1084 Method B (for cup/spindle) or ASTM D 4287 (for cone/plate). Alternatively, the viscosity can be periodically tested by measuring the time required for a fixed volume of samples to pass through a calibrated glass capillary using "gravity-flow" in accordance with ASTM D-445, IP 71.

If desired the end-capping catalyst starting material used i.e. one or more linear, branched or cyclic molecules comprising one or more groups selected from amidine groups, guanidine groups, derivatives of said amidine groups and/or guanidine groups or a mixture thereof may be left in the alkoxy end-capped polymer reaction end-product. Alternatively, depending on its physical characteristics, if merited and/or desired the end-capping catalyst may be extracted from the polymer reaction end-product subsequent to completion of the reaction. Catalyst extraction, if required, is undertaken at the end of the reaction process and may take place before or after introduction of the neutralising/stabilisation agent, as desired. The chosen method of extraction depends on the physical nature of the end-capping catalyst e.g. by filtration or possibly vacuum distillation.

Typically the end-capping process described above is carried out in the absence of other starting materials, however, if required additional starting materials which will not interfere with the end-capping process described herein such as plasticisers/extenders and or pigments may be present in the composition prior to the process, if desired. However, these are generally added during subsequent preparation of compositions utilising the end-capped polymer provided by the process herein, as discussed later in the description.

Furthermore, if desired, prior to or even concurrently with step (i) of the process hereinbefore described, chain-extenders may be introduced to extend the length of the polymer chain prior to end-capping with the polyalkoxysilanes.

The chain-extenders, may, for the sake of example, be difunctional silanes. Suitable difunctional silanes may have the following structure $$(R^{11})_2\text{—Si—}(R^{12})_2$$

Wherein each $R^{11}$ may be the same or different and may be linear, branched or cyclic but is a non-functional group, in that it is unreactive with the —OH groups or hydrolysable groups of organopolysiloxane polymer (a). Hence, each $R^{11}$ group is selected from an alkyl group having from 1 to 10 carbon atoms, an alkenyl group, an alkynyl group or an aryl group such as phenyl. In one alternative the $R^{11}$ groups are either alkyl groups or alkenyl groups, alternatively there may be one alkyl group and one alkenyl group per molecule. The alkenyl group may for example be selected from a linear or branched alkenyl groups such as vinyl, propenyl and hexenyl groups and the alkyl group has from 1 to 10 carbon atoms, such as methyl, ethyl or isopropyl. In a further alternative the two $R^{11}$s may be replaced by $R^{11}$ which is cyclic and bonds to the Si atom in two places.

Each group $R^{12}$ may be the same or different and is reactable with the hydroxyl or hydrolysable groups. Examples of group $R^{12}$ include alkoxy, acetoxy, oxime, hydroxy and/or acetamide groups. Alternatively, each $R^{12}$ is either an alkoxy group or an acetamide group. When $R^{12}$ is an alkoxy group, said alkoxy groups containing between 1 and 10 carbon atoms, for example methoxy, ethoxy, propoxy, isoproproxy, butoxy, and t-butoxy groups. Specific examples of suitable silanes for component (c) herein include, alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, vinyl methyldiacetoxysilane, vinylethyldiacetoxysilane and alkenylalkyldihydroxysilanes such as vinyl methyl dihydroxysilane, vinyl ethyldihydroxysilane, vinyl methyldihydroxysilane and vinylethyldihydroxysilane.

When $R^{12}$ is an acetamide the disilane may be a dialkyldiacetamidosilane or an alkylalkenyldiacetamidosilane. Such diacetamidosilanes are known chain-extending materials for low modulus sealant formulations as described in for example U.S. Pat. Nos. 5,017,628 and 3,996,184. The diacetamidosilanes may for example have the structure $$CH_3\text{—C(=O)—NR}^{13}\text{—Si(R}^{14})_2\text{—NR}^{13}\text{—C(=O)—}CH_3$$

wherein each $R^{13}$ may be the same or different and may be the same as R as defined above, alternatively, each $R^{13}$ may be the same or different and may comprise an alkyl group having from 1 to 6 carbons, alternatively 1 to 4 carbons. Each $R^{14}$ may also be the same or different and may also be the same as R as defined above comprise an alkyl group having from 1 to 6 carbons, alternatively 1 to 4 carbons or an alkenyl group having from 2 to 6 carbons, alternatively 2 to 4 carbons, alternatively vinyl. In use the diacetamidosilanes may be selected from one or more of the following:—

N, N'-(dimethylsilylene)bis[N-methylacetamide]
N, N'-(dimethylsilylene)bis[N-ethylacetamide]
N, N'-(diethylsilylene)bis[N-methylacetamide]
N, N'-(diethylsilylene)bis[N-ethylacetamide]
N, N'-(dimethylsilylene)bis[N-propylacetamide]

N, N'-(diethylsilylene)bis[N-propylacetamide]
N, N'-(dipropylsilylene)bis[N-methylacetamide]
N, N'-(dipropylsilylene)bis[N-ethylacetamide]
N, N'-(methylvinylsilylene)bis[N-ethylacetamide]
N, N'-(ethylvinylsilylene)bis[N-ethylacetamide]
N, N'-(propylvinylsilylene)bis[N-ethylacetamide]
N, N'-(methylvinylsilylene)bis[N-methylacetamide]
N, N'-(ethylvinylsilylene)bis[N-methylacetamide] and/or
N, N'-(propylvinylsilylene)bis[N-methylacetamide].

In an alternative, the dialkyldiacetamidosilane may be a dialkyldiacetamidosilane selected from N, N'-(dimethylsilylene)bis[N-ethylacetamide] and/or N, N'-(dimethylsilylene)bis[N-methylacetamide]. Alternatively, the dialkyldiacetamidosilane is N, N'-(dimethylsilylene)bis [N-ethylacetamide].

When present, the chain-extenders are present in an amount of from 0.01 to 5 wt. % of the composition, alternatively 0.05 to 1 wt. %.

When the above process is undertaken it may comprise (in the absence of additional steps, e.g. to make a final organopolysiloxane elastomer composition or the like composition), based on the weight of the final mixture:—

(ai) silanol terminated polydiorganosiloxane starting material in an amount of from 40 wt. % to 99.5 wt. % of the starting materials, alternatively 60 to 99.5 wt. % of the starting materials, alternatively from 70 to 99.5 wt. % of the starting materials, alternatively from 80 to 99.5 wt. % of the starting materials alternatively from 90 to 99.5 wt. % of the starting materials, alternatively from 95 to 99.5 wt. % of the starting materials;

(aii) one or more polyalkoxy silane starting material(s) of the structure:—

$$(R^2—O)_{(4-b)}—Si—R^1_b$$

where b is 0, 1 or 2, $R^2$ is an alkyl group which may be linear or branched having from 1 to 15 carbons and $R^1$ may be any suitable group i.e. a monovalent hydrocarbon radical such as $R^2$, cycloalkyl groups; alkenyl groups, aryl groups; aralkyl groups and groups obtained by replacing all or part of the hydrogen in the preceding organic groups with halogen; in an amount of from about 0.5 to 60 wt. % of the starting materials, alternatively 0.5 to 40 wt. % of the starting materials, 0.5 to 30 wt. % of the starting materials, 0.5 to 20 wt. % of the starting materials, 0.5 to 10 wt. % of the starting materials, alternatively 0.5 to 5 wt. % of the starting materials, alternatively 0.25 to 2.5 wt. % of the starting materials, (aiii) an end-capping catalyst in the form of any suitable basic catalyst which catalyses the alkoxy end-capping reaction. Such suitable basic catalyst include for the sake of example tetramethylammonium hydroxide amines, basic inorganic oxides, titanium/amine combinations, carboxylic acid/amine combinations, N,N'-disubstituted hydroxylamines, carbamates, metal hydroxides such as sodium hydroxide, potassium hydroxide, lithium hydroxide and oxime-containing organic compounds but preferably consists of one or more linear, branched or cyclic molecules comprising at least one amidine group, guanidine group, or derivatives of said amidine group and/or guanidine group or a mixture thereof. The catalyst may be introduced in any suitable amount dependent of the catalyst chosen for use. In the case of said preferred one or more linear, branched or cyclic molecules comprising at least one amidine group, guanidine group, or derivatives of said amidine group and/or guanidine group or a mixture thereof said catalysts are provided in an amount of from 0.0005 to 0.75 wt. % of the starting materials composition.

It is to be remembered that if desired the one or more polyalkoxy silanes (aii) may be provided in a large excess for reasons discussed elsewhere.

As previously mentioned, upon completion of the a stabilizing/neutralising agent selected from one or more fatty acids having from 8 to 26 carbons, an alkane sulphonic acid having from 1 to 10 carbons acidic fumed silica and/or one or more acidic liquid polybutadienes or a mixture thereof, is added to the composition. Preferably step (ii) of the process utilises the stabilizing/neutralising agent being introduced to the alkoxy terminated polydiorganosiloxane polymer reaction end-product or later during the preparation of the to the alkoxy end-capped diorganopolysiloxane end-product in an amount of from 0.05 to 10 wt. % of the starting materials.

Step (ii) of the process as described herein may take place immediately or shortly after completion of step (i). This action stabilises the step (i) alkoxy end-capped diorganopolysiloxane end-product. This stabilises said alkoxy end-capped diorganopolysiloxane end-product and enables it to be stored for future use for several months.

Alternatively, step (ii) of the above process may take place during or even after the preparation of an organopolysiloxane elastomer composition as described herein. For example, after the filler has been introduced into the organopolysiloxane elastomer composition. It was found that the late undertaking of step (ii) results in a stabilised organopolysiloxane elastomer composition, enabling the aforementioned organopolysiloxane elastomer composition to be stable for several months before use. This is particularly important in the case of when tin-based catalysts are being used as the condensation catalysts because otherwise reversion problems are likely to occur.

In one embodiment, typically, the silanol terminated polydiorganosiloxane starting material (ai) is introduced into a suitable mixer and is stirred; the one or more polyalkoxy silanes (aii) is then added and the resulting mixture is mixed again. Any suitable mixing time can be used for step (i) e.g. 10 to 30 minutes, alternatively 10 to 20 minutes.

Optionally the mixing in step (i) may be carried out at an elevated temperature of up to about 100° C., e.g. from 35 to 100° C., alternatively from 50 to 80° C. The end-capping catalyst may be introduced prior to, simultaneously with or subsequent to the addition of the one or more polyalkoxy silanes as deemed necessary.

The resulting alkoxy end-capped polymer reaction end-product may, if desired, be isolated from by-products and end-capping catalysts etc if desired. Alternatively, an equimolar amount of polymer (ai) and polyalkoxy silanes (aii) may be utilised in the reaction process so that there is no excess of polyalkoxy silanes (aii), but equally if desired an excess of polyalkoxy silane starting material (aii) may be added into the above reaction mixture, with the intention of any excess polyalkoxy silanes (aii) being utilised as cross-linker (c) or part of cross-linker (c) in the preparation of an organopolysiloxane elastomer composition.

In the event it is desired for the polymer to be chain-extended, a chain extension process step is also undertaken. Typically in this case the chain-extender is added in a first step instead of the one or more polyalkoxy silanes and then after a chain-extension step, involving the catalyst as descried above is considered completed the polyalkoxy silanes are introduced into the mixture with the intention of end-capping the chain-extended polymer. The mixing may take place in any suitable type of mixer e.g. a speedmixer or Turello mixer. Alternatively, the chain-extending silane and end-capping silane may be added simultaneously if the silanes are different. Alternatively, the chain-extending silane and end-capping silane may be added separately if they are the same silane.

The resulting alkoxy end-capped polymer reaction end-product may, if desired, be isolated from by-products and end-capping catalysts etc. Alternatively, an equimolar amount of polymer (ai) and polyalkoxy silanes (aii) may be utilised in the reaction process so that there is no excess of polyalkoxy silanes (aii) but equally if desired an excess of polyalkoxy silanes (aii) may be added for the above reaction, with the intention of excess polyalkoxy silanes (aii) being utilised as a cross-linker or part of a cross-linker content in the preparation of an organopolysiloxane elastomer composition.

The resulting alkoxy end-capped polydiorganosiloxane polymer reaction end-product may be collected and stored for future use (in which case step (ii) is undertaken immediately or shortly after completion of step (i) of the process or is used immediately as part of a process for the preparation of an organopolysiloxane elastomer composition comprising:—

(a) An alkoxy terminated polydiorganosiloxane prepared as hereinbefore described;
(b) filler;
(d) condensation cure catalyst;
(c) cross-linker and optionally
(e) adhesion promoter.

As previously indicated in the latter situation step (ii) of the process above may take place immediately or shortly after completion of step (i) of the process or may take place during the preparation of the organopolysiloxane elastomer composition, i.e. it may be added shortly after the addition of filler as previously described.

In the present disclosure the alkoxy end-capped polydiorganosiloxane polymer reaction end-product is designed to be used after extended storage because of the incorporation of the acidic stabilizing/neutralising agent, however there is no problem if it is desired to include the introduction of the stabilizing/neutralising agent in the process even if the alkoxy end-capped polydiorganosiloxane polymer reaction end-product is to be used in a continuous process to immediately prepare an organopolysiloxane elastomer composition. As previously discussed, it was found that there was need to use the aforementioned acidic stabilizing/neutralising agent when there was an intention to store it for an extended period of time.

The alkoxy terminated polydiorganosiloxane (a), is typically present in the composition in an amount of from 40 to 80 wt. % of an organopolysiloxane elastomer composition, alternatively from about 40 to 65 wt. % of the organopolysiloxane elastomer composition.

The above composition is suitable as an organopolysiloxane elastomer composition and may be designed to form a product upon cure having a low modulus and/or which is non-staining in that plasticizers and/or extenders (sometime referred to as processing aids) do not leech out and stain neighbouring substrates such as concrete blocks or other building materials.

Typically if a low modulus sealant composition is desired, the polymer made by the process described herein would have been chain-extended as discussed above so that the alkoxy end-capped polymer (a) is designed to be of a high molecular weight/chain length.

Filler (b) may be one or more a reinforcing fillers or one or more non-reinforcing filler or a combination of both. For example, filler (b) may contain one or more finely divided, reinforcing fillers such as precipitated calcium carbonate, ground calcium carbonate, fumed silica, colloidal silica and/or precipitated silica. Typically, the surface area of the filler (b) is at least 15 $m^2/g$ in the case of precipitated calcium carbonate measured in accordance with the BET method in accordance with ISO 9277: 2010, alternatively 15 to 50 $m^2/g$, alternatively, 15 to 25 $m^2/g$ in the case of precipitated calcium carbonate. Silica reinforcing fillers have a typical surface area of at least 50 $m^2/g$. In one embodiment filler (b) is a precipitated calcium carbonate, precipitated silica and/or fumed silica; alternatively, precipitated calcium carbonate. In the case of high surface area fumed silica and/or high surface area precipitated silica, these may have surface areas of from 75 to 400 $m^2/g$ measured using the BET method in accordance with ISO 9277: 2010, alternatively of from 100 to 300 $m^2/g$ using the BET method in accordance with ISO 9277: 2010.

Typically, the fillers (b) are present in the composition in an amount of from about 5 to 45 wt. % of the composition, alternatively from about 5 to 30 wt. % of the composition, alternatively from about 5 to 25 wt. % of the composition, depending on the chosen filler. It will be appreciated that in the event of silica being used in step (ii) of the process that the amount of filler required will be cumulative as any silica filler added as the neutralising agent/stabiliser will contribute to the filler content of the organopolysiloxane elastomer composition. Hence, if 2.5 wt. % of silica is used as the neutralising agent/stabiliser step (ii) the total amount of filler in the organopolysiloxane elastomer composition will be 2.5 wt. % greater than the amount of filler added into the composition if introduced separately.

Filler (b) may be hydrophobically treated for example with one or more aliphatic acids, e.g. a fatty acid such as stearic acid or a fatty acid ester such as a stearate, or with organosilanes, organosiloxanes, or organosilazanes hexaalkyl disilazane or short chain siloxane diols to render the filler(s) (b) hydrophobic and therefore easier to handle and obtain a homogeneous mixture with the other adhesive components. The surface treatment of the fillers makes them easily wetted by alkoxy terminated polydiorganosiloxane (a) of the base component. These surface modified fillers do not clump and can be homogeneously incorporated into the alkoxy terminated polydiorganosiloxane (a) of the base component. This results in improved room temperature mechanical properties of the uncured compositions. The fillers may be pre-treated or may be treated in situ when being mixed with alkoxy terminated polydiorganosiloxane (a).

The organopolysiloxane elastomer composition also comprises a condensation cure catalyst. The condensation cure catalyst may be a tin based catalyst. Any suitable tin catalyst may be utilised. Said tin catalyst, may comprise one or more of the following tin triflates, organic tin metal catalysts such as triethyltin tartrate, tin octoate, tin oleate, tin naphthenate, butyltintri-2-ethylhexoate, tin butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dibutyltin dibenzoate, stannous octoate, dibutyltin bis(2,4-pentanedionate, dimethyltin dineodecanoate (DMTDN) and dibutyltin dioctoate.

Alternatively or additionally the condensation cure catalyst (d) may comprise a titanate and/or zirconate based catalyst e.g. according to the general formula $Ti[OR^{22}]_4$ or $Zr[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate and/or zirconate may contain partially unsaturated groups. Examples of $R^{22}$ include but are not restricted to methyl, ethyl, propyl, isopropyl, butyl, tertiary butyl and a branched secondary alkyl group such as 2, 4-dimethyl-3-pentyl. Alternatively, when each $R^{22}$ is the same, $R^{22}$ is an isopropyl, branched secondary alkyl group or a tertiary alkyl group, in particular, tertiary butyl. In one alternative the catalyst is a titanate. Suitable titanate examples include tetra n-butyl titanate, tetra t-butyl titanate, titanium tetrabutoxide and tetraisopropyl titanate. Suitable zirconate examples include tetra-n-propyl zirconate, tetra-n-butyl zirconate and zirconium diethylcitrate.

Alternatively, the titanate and/or zirconate may be chelated. The chelation may be with any suitable chelating agent such as an alkyl acetylacetonate such as methyl or ethyl acetylacetonate. Alternatively, the titanate may be monoalkoxy titanates bearing three chelating agents such as for example 2-propanolato, tris isooctadecanoato titanate or Diisopropoxy-bisethylacetoacetatotitanate.

Condensation cure catalyst (d) is typically present in the composition in an amount of from 0.25 to 4.0 wt. % of the composition, alternatively from 0.25 to 3 wt. % of the composition, alternatively from 0.3% to 2.5 wt. % of the composition.

The separate addition of a cross-linker (c) into said one-part, organopolysiloxane elastomer composition is, during the preparation of the said composition, optional. This is because whilst an essential ingredient in said organopolysiloxane elastomer composition, the cross-linker (c) may be the same as the one or more polyalkoxy silanes of the structure $(R^2—O)_{(4-b)}—Si—R^1_b$ used in the end-capping reaction described above, wherein $R^2$, $R^1$ and b are as described before. When this is the case it is possible for the polyalkoxy silanes to be introduced into the reaction mixture for end capping the silanol polymer in sufficient excess at the time of the end-capping reaction that no additional cross-linking agent (c) is required at the time of preparing the organopolysiloxane elastomer compositions. However, if deemed necessary additional cross-linker(s) may be added at the time of preparing the one-part, alkoxy-functional silicone sealant composition.

When an amount of cross-linker (c) is added at the time of preparing the organopolysiloxane elastomer compositions, any suitable cross-linker having at least three groups per molecule which are reactable with the hydroxyl or hydrolysable groups, a chain-extended alkoxy terminated polydiorganosiloxane (a) may be utilised. Typically, any cross-linker (c) added is one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, iso-butoxy and propoxy) and alkenyloxy groups (for example isopropenyloxy and 1-ethyl-2-me thylvinyloxy).

When cross-linking agent (c) is required, it may comprise siloxane based cross-linkers having a straight chained, branched, or cyclic molecular structure.

Cross-linker (c) has at least three or four hydroxyl and/or hydrolysable groups per molecule which are reactive with the hydroxyl and/or hydrolysable groups in alkoxy terminated polydiorganosiloxane (a). When cross-linker (c) is required to be added, the cross-linker (c) may alternatively be a silane and when the silane has a total of three silicon-bonded hydroxyl and/or hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linker (c) include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo) silane, vinyl-tris-me thyle thylketoximo) silane, methyltris (methylethylketoximino)silane, methyltris(isopropenoxy) silane, vinyltris(isopropenoxy)silane, ethylpolysilicate, n-propylorthosilicate, ethylorthosilicate and/or dimethyltetraacetoxydisiloxane. Cross-linker (c) may alternatively comprise any combination of two or more of the above.

Alternatively, cross-linker (c) may comprise a silyl functional molecule containing two or more silyl groups, each silyl group containing at least one —OH or hydrolysable group, the total of number of —OH groups and/or hydrolysable groups per cross-linker molecule being at least 3. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain having a siloxane or organic polymeric backbone. In the case of such siloxane or organic based cross-linkers (c) the molecular structure can be straight chained, branched, cyclic or macromolecular. In the case of siloxane-based polymers the viscosity of the cross-linker (c) will be within the range of from 15 mPa·s to 50,000 mPa·s at 25° C. measured using either a Brookfield® rotational viscometer with spindle LV-4 (designed for viscosities in the range between 1,000-2,000,000 mPa·s) or a Brookfield® rotational viscometer with spindle LV-1 (designed for viscosities in the range between 15-20,000 mPa·s) for viscosities less than 1000 mPa·s and adapting the speed according to the polymer viscosity.

For example, if required to be added, cross-linker (c) may be a disilyl functional polymer, that is, a polymer containing two silyl groups, each having at least one hydrolysable group such as described by the formula $$R_nSi(X)_{3-n}—Z^4—Si(X)_{3-n}R_n$$

where each R, and n may be individually selected as hereinbefore described above. $Z^4$ is an alkylene (divalent hydrocarbon group), alternatively an alkylene group having from 1 to 10 carbon atoms, or further alternatively 1 to 6 carbon atoms or a combination of said divalent hydrocarbon groups and divalent siloxane groups.

Each X group may be the same or different and can be a hydroxyl group or a condensable or hydrolyzable group. The term "hydrolyzable group" means any group attached to the silicon which is hydrolyzed by water at room temperature. The hydrolyzable group X includes groups of the formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or $-(CH_2CH_2O)_2CH_3$. The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy.

Preferred di-silyl functional polymer cross-linkers have n=0 or 1, X=OMe and $R^4$ being an alkylene group with 4 to 6 carbons.

Examples of disilyl polymeric cross-linkers with a silicone or organic polymer chain bearing alkoxy functional end groups include polydimethylsiloxanes having at least one trialkoxy terminal where the alkoxy group may be a methoxy or ethoxy group. Examples might include or 1, 6-bis(trimethoxy silyl)hexane, hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane. In one embodiment the cross-linker may be one or more of vinyltrimethoxysilane, methyltrimethoxysilane and/or vinylmethyldimethoxysilane.

The compositions suitably contain cross-linker (c) in at least a stoichiometric amount as compared to alkoxy terminated polydiorganosiloxane (a) described above, irrespective of whether it originates as an excess from the end-capping reaction or from addition thereof after completion of the end-capping reaction or a combination of the two. Hence, the amount present will also depend upon the particular nature of the cross-linker (c) utilised and in particular, the molecular weight of the molecule selected. The cross-linker is therefore typically present in the composition in an amount of from 0.1 to 5 wt. % of the composition but may potentially be present in a greater amount.

When present, component (e) is an adhesion promoter, suitable adhesion promoters (e) may comprise alkoxysilanes of the formula $R^{14}{}_hSi(OR^{15})_{(4-h)}$, where subscript h is 1, 2, or 3, alternatively h is 3. Each RH is independently a monovalent organofunctional group. RH can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and isopropyl.

Alternatively the adhesion promoter may be glycidoxypropyltrimethoxysilane or a multifunctional material obtained by reacting two or more of the above. For example, the reaction product of an alkylalkoxysilicone e.g. trimethoxymethylsilane; an aminoalkoxysilane, e.g. 3-aminopropyl trimethoxysilane and an epoxyalkoxysilane e.g. glycidoxypropyl trimethoxysilane; in a weight ratio of (i):(ii):(iii) of 0.1-6:0.1-5:1.

Examples of suitable adhesion promoters (e) may also include and molecules of the structure $$(R'O)_3Si(CH_2)_gN(H)-(CH_2)_qNH_2$$

in which each R' may be the same or different and is an alkyl group containing from 1 to 10 carbon atoms, g is from 2 to 10 and q is from 2 to 10.

The organopolysiloxane elastomer composition may comprise, when present, 0.01% to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Other additives may be used, if necessary, in said organopolysiloxane elastomer composition. These may include rheology modifiers, stabilizers such as anti-oxidants, UV and/or light stabilizers, pigments, —OH scavengers (moisture/water/alcohol) (typically silazanes or the same compounds as those used as cross-linkers), plasticisers and/or extenders (sometimes identified as processing aids) and fungicides and/or biocides and the like. It will be appreciated that some of the additives are included in more than one list of additives. Such additives would then have the ability to function in all the different ways referred to.

Rheology modifiers which may be incorporated in moisture curable compositions according to the invention include silicone organic co-polymers such as those described in EP0802233 based on polyols of polyethers or polyesters; waxes such as polyamide waxes, non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion to substrates, particularly plastic substrates.

Any suitable anti-oxidant(s) may be utilised, if deemed required. Examples may include: ethylene bis (oxyethylene) bis(3-tert-butyl-4-hydroxy-5(methylhydrocinnamate) 36443-68-2; tetrakis[methylene(3,5-di-tert-butyl-4-hydroxy hydrocinnamate)]methane 6683-19-8; octadecyl 3,5-di-tert-butyl-4-hydroxyhyrocinnamate 2082-79-3; N,N'-hexamethylene-bis (3,5-di-tert-butyl-4-hydroxyhyrocinnamamide) 23128-74-7; 3,5-di-tert-butyl-4-hydroxyhydrocinnamic acid,C7-9 branched alkyl esters 125643-61-0; N-phenylbenzene amine, reaction products with 2,4,4-trimethylpentene 68411-46-1; e.g. anti-oxidants sold under the Irganox® name from BASF.

UV and/or light stabilizers may include, for the sake of example include benzotriazole, ultraviolet light absorbers and/or hindered amine light stabilizers (HALS) such as the TINUVIN® product line from Ciba Specialty Chemicals Inc.

Pigments are utilized to colour the composition as required. Any suitable pigment may be utilized providing it is compatible with the composition. In two-part compositions pigments and/or coloured (non-white) fillers, e.g. carbon black may be utilized to colour the end adhesive product. When present carbon black will function as both a non-reinforcing filler and colorant and is present in a range of from 1 to 30 wt. % of the composition, alternatively from 1 to 20 wt. % of the catalyst package composition; alternatively, from 5 to 20 wt. % of the composition, alternatively, from 7.5 to 20 wt. % of the composition.

Any suitable —OH (moisture/water/alcohol) scavenger may be used, for example orthoformic acid esters, molecular sieves, silazanes e.g. organosilazanes hexaalkyl disilazane, e.g. hexamethyldisilazane and/or one or more silanes of the structure $R^{20}_jSi(OR^{21})_{4-j}$ where each $R^{21}$ may be the same or different and is an alkyl group containing at least 2 carbon atoms;

j is 1 or 0; and $R^{20}$ is a silicon-bonded organic group selected from a substituted or unsubstituted straight or branched monovalent hydrocarbon group having at least 2 carbons, a cycloalkyl group, an aryl group, an aralkyl group or any one of the foregoing wherein at least one hydrogen atom bonded to carbon is substituted by a halogen atom, or an organic group having an epoxy group, a glycidyl group, an acyl group, a carboxyl group, an ester group, an amino group, an amide group, a (meth) acryl group, a mercapto group or an isocyanate group. When present the —OH scavenger is typically present in a range of from 0.5 to 3.0 wt. % of the total composition, however the amount may be more dependent on the amounts of alcoholic by-products being generated and the process being used to generate the composition. The scavenged by-products are intentionally removed, if possible, from the final organopolysiloxane elastomer composition to attain stability and prevent pre-cure reversion during storage.

Plasticisers and/or Extenders (Sometimes Identified as Processing Aids)

Any suitable plasticiser or extender may be used if desired. These may be any of the plasticisers or extenders identified in GB2445821, incorporated herein by reference. When used a plasticiser or extender may be added before, after or during the preparation of the polymer, However, it does not contribute to or participate in the polymerisation process.

Examples of plasticisers or extenders include silicon containing liquids such as hexamethyldisiloxane, octamethyltrisiloxane, and other short chain linear siloxanes such as octamethyltrisiloxane, decamethyltetrasiloxane, dodecamethylpentasiloxane, tetradecamethylhexasiloxane, hexadeamethylheptasiloxane, heptamethyl-3-{(trimethylsilypoxy)}trisiloxane, cyclic siloxanes such as hexamethylcyclotrisiloxane, octamethylcyclotetrasiloxane, decamethylcyclopentasiloxane, dodecamethylcyclohexasiloxane; further polydiorganosiloxanes, optionally including aryl functional siloxanes, having a viscosity of from 0.5 to 12,500 mPa·s, measured at 25° C.; using Glass Capillary Viscometer (ASTM D-445, IP 71) for 0.5 to 5000 mPa·s (the 5000 mPa·s needs test at 100° C.). For 5000-12500 mPa·s, it will use Brookfield cone plate viscometer RV DIII with a cone plate CP-52 at 5 rpm (ASTM D4287).

Alternatively, the plasticisers or extenders may include organic liquids such as butyl acetate, alkanes, alcohols, ketones, esters, ethers, glycols, glycol ethers, hydrocarbons, hydrofluorocarbons or any other material which can dilute the composition without adversely affecting any of the component materials. Hydrocarbons include isododecane, isohexadecane, Isopar™ L (C11-C 13), Isopar™ H (C11-C12), hydrogenated polydecene, mineral oil, especially hydrogenated mineral oil or white oil, liquid polyisobutene, isoparaffinic oil or petroleum jelly. Ethers and esters include isodecyl neopentanoate, neopentylglycol heptanoate, glycol distearate, dicaprylyl carbonate, diethylhexyl carbonate, propylene glycol n butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, and octyl palmitate. Additional organic diluents include fats, oils, fatty acids, and fatty alcohols. A mixture may also be used.

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl]methyl]-1H-1,2,4-triazole.

The fungicide and/or biocide may suitably be present in an amount of from 0 to 0.3 wt. % of the composition and may be present in an encapsulated form where required such as described in EP2106418.

In general polymer (a) is prepared as described above, which is at least partially completed prior to addition of the other ingredients. Typically, the end-capping reaction is taken to completion, acidic stabilizing/neutralising agent added and if desired end-capping catalyst removed before other ingredients of the organopolysiloxane elastomer composition are added. If desired, immediately after the end-capping process described herein has been completed (including introducing the acidic stabilizing/neutralising agent added and if desired end-capping catalyst removed) the additional ingredients of the organopolysiloxane elastomer composition may be introduced. However, the stabilisation effect identified herein by adding the neutralising/stabilising additive enables the end-capped polymer reaction end-product to be stored for several months prior to use.

As and when desired the alkoxy end-capped polymer reaction product may be used as ingredient (a) in organopolysiloxane elastomer composition with the other ingredients introduced into the composition in any suitable order. As previously discussed all or some of the polyalkoxy silane excess from the end-capping reaction may be utilised as the cross-linker and as such further cross-linker is optional, providing sufficient cross-linker is available in the final organopolysiloxane elastomer composition for the composition to cure into an elastomeric product.

The first ingredient added to end-capped polymer reaction end-product (a) may for example be filler(s) (b) so as to effectively form a base comprising the alkoxy terminated polydiorganosiloxane (a) and filler (b). The other ingredients may then be added in any preferred order of the addition such as additional cross-linker (c) if required, followed by cure catalyst (d) followed by adhesion promoter (e) if required with the other optional additional ingredients added as and if required. Alternatively, the adhesion promoter when present, additional cross-linker, when required and condensation cure catalyst may be added first followed by the filler(s) and finally the stabilizer.

The process described herein is utilised to produce alkoxy terminated polydiorganosiloxane polymers. The alkoxy terminated polydiorganosiloxane polymers produced by the process described herein may be incorporated into an organopolysiloxane elastomer compositions. The compositions are preferably room temperature vulcanisable compositions in that they cure at room temperature without heating but may if deemed appropriate be accelerated by heating.

The organopolysiloxane elastomer compositions prepared from the alkoxy terminated polydiorganosiloxane polymer reaction end-product produced by the process described herein may be designed to provide a low modulus and high extension sealant, adhesive and/or coating composition. Low modulus silicone sealant compositions are preferably "gunnable" i.e. they have a suitable extrusion capability i.e. a minimum extrusion rate of 10 ml/min as measured by ASTM C1183-04, alternatively 10 to 1000 mL/min, and alternatively 100 to 1000 mL/min.

The ingredients and their amounts in the organopolysiloxane elastomer composition may be selected to impart a movement capability to the post-cured sealant material. The movement capability is greater than 25%, alternatively movement capability ranges from 25% to 50%, as measured by ASTM C719-13.

An organopolysiloxane elastomer composition as hereinbefore described may be a gunnable sealant composition used for (i) space/gap filling applications;
(ii) seal applications, such as sealing the edge of a lap joint in a construction membrane; or
(iii) seal penetration applications, e.g., sealing a vent in a construction membrane;
(iv) adhering at least two substrates together.
(v) a laminating layer between two substrates to produce a laminate of the first substrate, the sealant product and the second substrate.

In the case of (v) above, when used as a layer in a laminate, the laminate structure produced is not limited to these three layers. Additional layers of cured sealant and substrate may be applied. The layer of gunnable organopolysiloxane elastomer composition in the laminate may be continuous or discontinuous.

An organopolysiloxane elastomer composition prepared from the alkoxy terminated polydiorganosiloxane polymers produced by the process described herein may be applied on to any suitable substrate. Suitable substrates may include, but are not limited to, glass; concrete; brick; stucco; metals, such as aluminium, copper, gold, nickel, silicon, silver, stainless steel alloys, and titanium; ceramic materials; plastics including engineered plastics such as epoxies, polycarbonates, poly(butylene terephthalate) resins, polyamide resins and blends thereof, such as blends of polyamide resins with syndiotactic polystyrene such as those commercially available from The Dow Chemical Company, of Midland, Michigan, U.S.A., acrylonitrile-butadiene-styrenes, styrene-modified poly(phenylene oxides), poly(phenylene sulfides), vinyl esters, polyphthalamides, and polyimides; cellulosic substrates such as paper, fabric, and wood; and combinations thereof. When more than one substrate is used, there is no requirement for the substrates to be made of the same material. For example, it is possible to form a laminate of plastic and metal substrates or wood and plastic substrates.

In the case of organopolysiloxane elastomer compositions prepared from the alkoxy terminated polydiorganosiloxane polymers produced by the process described herein, there is provided a method for filling a space between two substrates so as to create a seal therebetween, comprising:

a) providing a silicone composition as hereinbefore described, and either
b) applying the silicone composition to a first substrate, and bringing a second substrate in contact with the silicone composition that has been applied to the first substrate, or
c) filling a space formed by the arrangement of a first substrate and a second substrate with the silicone composition and curing the silicone composition.

In one alternative, an organopolysiloxane elastomer compositions prepared from the alkoxy terminated polydiorganosiloxane polymers produced by the process described herein may be a self-levelling sealant, e.g. a self-levelling highway sealant. A self-levelling sealant composition means it is "self-levelling" when extruded from a storage container into a horizontal joint; that is, the sealant will flow under the force of gravity sufficiently to provide intimate contact between the sealant and the sides of the joint space. This allows maximum adhesion of the sealant to the joint surface to take place. The self-levelling also does away with the necessity of tooling the sealant after it is placed into the joint, such as is required with a sealant which is designed for use in both horizontal and vertical joints. Hence, the sealant flow sufficiently well to fill a crack upon application. If the sealant has sufficient flow, under the force of gravity, it will form an intimate contact with the sides of the irregular crack walls and form a good bond; without the necessity of tooling the sealant after it is extruded into the crack, in order to mechanically force it into contact with the crack sidewalls.

Self-levelling compositions as described herein are useful as a sealant having the unique combination of properties required to function in the sealing of asphalt pavement. Asphalt paving material is used to form asphalt highways by building up an appreciable thickness of material, such as 20.32 cm, and for rehabilitating deteriorating concrete highways by overlaying with a layer of a thickness such as 10.16 cm. Asphalt overlays undergo a phenomenon known as reflection cracking in which cracks form in the asphalt overlay due to the movement of the underlying concrete at the joints present in the concrete. These reflection cracks need to be sealed to prevent the intrusion of water into the crack, which will cause further destruction of the asphalt pavement when the water freezes and expands.

In order to form an effective seal for cracks that are subjected to movement for any reason, such as thermal expansion and contraction, the seal material must bond to the interface at the sidewall of the crack and must not fail cohesively when the crack compresses and expands. In the case of the asphalt pavement, the sealant must not exert enough strain on the asphalt at the interface to cause the asphalt itself to fail; that is, the modulus of the sealant must be low enough that the stress applied at the bond line is well below the yield strength of the asphalt.

In such instances, the modulus of the cured material is designed to be low enough so that it does not exert sufficient force on the asphalt to cause the asphalt to fail cohesively. The cured material is such that when it is put under tension, the level of stress caused by the tension decreases with time so that the joint is not subjected to high stress levels, even if the elongation is severe.

Alternatively, the silicone sealant composition prepared from the alkoxy terminated polydiorganosiloxane polymer reaction end-product produced by the process described herein may be utilised as an elastomeric coating composition, e.g. as a barrier coating for construction materials or as a weatherproof coating for a roof, the composition may have a viscosity not dissimilar to a paint thereby enabling application by e.g. brush, roller or spray gun or the like. A coating composition as described herein, when applied onto a substrate, may be designed to provide the substrate with e.g. long-term protection from air and water infiltration, under normal movement situations caused by e.g. seasonal thermal expansion and/or contraction, ultra-violet light and the weather.

EXAMPLES

All viscosity measurements were undertaken using a Brookfield® rotational viscometer with spindle LV-4 (designed for viscosities in the range between 1,000-2,000,000 mPa·s and adapting the speed according to the polymer viscosity, unless otherwise indicated and measurements were taken at 25° C.

TABLE 1

Starting materials used to prepare alkoxy end-capped polymer - proportions of each starting material and acidic stabilizing/neutralising agent provided in grams

| Material | Comp. Ex. 1 | Ex. 1 | Ex. 2 | Ex. 3 |
|---|---|---|---|---|
| Polymer 1 | 50 | 50 | 50 | 50 |
| Vinyl trimethoxy silane | 1.4 | 1.4 | 1.4 | 1.4 |
| Methyl trimethoxy silane (MTM) | 1.4 | 1.4 | 1.4 | 1.4 |
| 1 wt. % TBD in MTM | 0.2 | 0.2 | 0.2 | 0.2 |
| Oleic acid | | 0.1 | 0.2 | |
| Polyvest ® MA 75 | | | | 0.1 |

Polymer 1 indicated in Table 1 was a dimethylsilanol terminated polydimethyl siloxane having a viscosity of about 50,000 mPa·s which was alkoxy end-capped during the reaction described below. TBD was 1,5,7-Triazabicyclo [4.4.0]dec-5-ene. Polyvest® MA 75 was obtained from Evonik Corporation and is defined in the manufacturer's datasheet as "a maleic anhydride functionalized adduct of a low molecular weight 1,4-cis liquid polybutadiene which has succinic anhydride groups randomly distributed along the polymer chains".

The alkoxy end-capping reaction was carried out using the following process in a speed mixer:

1) A 1 wt. % solution of TBD end-capping catalyst in methyl trimethoxy silane was initially prepared by dissolving TBD end-capping catalyst in methyl trimethoxy silane to prepare an end-capping catalyst solution;
2) The polymer, vinyl trimethoxy silane, methyl trimethoxy silane and catalyst solution were then introduced into the speed mixer mixing cup and were mixed at a speed of about 2500 rpm for two periods of 20 seconds;
3) The mixture resulting from step 2 was then left to react at room temperature for a period of 30 minutes, which was found to result in the end-capping reaction having gone to completion;
4) When present the oleic acid or Polyvest® MA 75 was then added to the reaction product of step (3) and were mixed at a speed of about 2500 rpm for two periods of 20 seconds.

The variation of viscosity of the alkoxy end-capped polymer reaction product from the above processes was assessed over time and to determine how long the level of stability of each alkoxy end-capped polymer product prepared. The viscosity test was performed using a Brookfield DVIII Ultra with cone 52 under 5 rpm for 1 min. Compositions were mixed and measured at room temperature (about 25° C.). The results are depicted in Table 2 below.

TABLE 2

Variation in viscosity of the polymer reaction end-product from the reaction described above in Table 1.

| Time after mixing | Comp. Ex. 1 | Ex. 1 | Ex. 2 | Ex. 3 |
|---|---|---|---|---|
| | Viscosity (mPa · s) | | | |
| 14 hours | 39053 | 39688 | 37307 | 37783 |
| 4 days | 31099 | | | |
| 10 days | | 40164 | 36830 | 27783 |
| 17 days | 20797 | 40006 | 37942 | 39370 |
| 33 days | 13018 | 41752 | 38577 | 40482 |
| 52 days | 8366 | 40799 | 37307 | 40006 |
| 90 days | Not tested | 39053 | 36989 | 40482 |
| 150 days | Not tested | 40323 | 36989 | 41434 |

As seen from Table 2 compositions containing 0.1 wt. % or higher of oleic acid or Polyvest® MA 75 remained stable even after 5 months of aging at room temperature. However, it was found that the comparative example which was not stabilized as described herein was only stable for a few days.

In the following there is provided a continuous process commencing with the preparation of an alkoxy end-capping of the silanol polymer and the use of the resulting polymer reaction end-product as a mixture of polymer and cross-linker for an organopolysiloxane elastomer composition. The ingredients in Tables 3a and 3b are provided such that the total compositions of all ingredients per organopolysiloxane elastomer composition add up to 100 wt. % of the composition.

TABLE 3a

Relative amounts (wt. % of total composition) of the ingredients used in the end-capping reaction.

| | Comp. Ex. 2 | Ex. 4 | Comp. Ex. 3 | Ex. 5 |
|---|---|---|---|---|
| Polymer 1 | 47.65 | 47.63 | 39.38 | 37.36 |
| Plasticiser | | | 9.64 | 10 |
| Vinyl trimethoxy silane | 1.40 | 1.40 | 1.25 | 1.25 |
| Methyl trimethoxy silane (MTM) | 1.40 | 1.20 | 1.35 | 1.35 |
| 1 wt. % TBD in MTM | 0.20 | 0.20 | 0.15 | 0.15 |
| Oleic acid | | 0.10 | | |

The plasticiser used in Table 3a was a trimethyl terminated polydimethylsiloxane having a viscosity of 100 mPa·s at 25° C.

The alkoxy end-capping reaction using the ingredients of Table 3a was carried out using the following process in a speed mixer.

1) A 1 wt. % solution of TBD end-capping catalyst in methyl trimethoxy silane was initially prepared by dissolving TBD end-capping catalyst in methyl trimethoxy silane and then the vinyl trimethoxysilane was added to provide an end-capping catalyst solution;
2) The polymer, and plasticiser were mixed together in a 10 litre Turello mixer at about 400 rpm;
3) The end-capping catalyst mixture was then introduced into the mixture resulting from step 2 above and this combination was then stirred at 400 rpm for 15 minutes at room temperature;

4) After the 15 minutes of mixing the oleic acid or the like neutralising agent/stabilizing agent was added to the mixture and mixed in to provide a stabilized alkoxy end-capped polymer reaction end-product as hereinbefore described;

In these examples the above formed the first part of a continuous process to prepare an organopolysiloxane elastomer composition. The remaining ingredients in the composition are identified in Table 3b.

TABLE 3b

Relative amounts (wt. % of total composition) of the ingredients used in the preparation of the organopolysiloxane elastomer compositions

| | Comp. Ex. 2 | Ex. 4 | Comp. Ex. 3 | Ex. 5 |
|---|---|---|---|---|
| Dimethylbis(N-ethylacetamido)silane | 0.25 | 0.25 | | |
| Hexamethyldisilazane | | | 1.50 | 1.50 |
| Precipitated calcium carbonate having an average particle size of 60-70 nm | 32.12 | 32.12 | 37.14 | |
| Fumed silica having an average BET surface area of 130-170 $m^2/g$ | | | | 4.30 |
| Ground calcium carbonate having a D50 average particle size of 4.6 μm | 15.21 | 15.3 | 8.70 | 43.56 |
| Dimethyl tin dineodecanoate | 0.50 | 0.50 | | |
| Tyzor ® PITA SM | 1.10 | 1.10 | | |
| Bis(lauroyloxy)dioctyltin | | | 0.08 | 0.08 |
| Dibutyl tin dilaurate | | | 0.05 | 0.05 |
| tetra n-butyl titanate | 0.10 | | | |
| N-[3-(Trimethoxysilyl)propyl]ethylenediamine | 0.070 | 0.12 | 0.25 | 0.25 |
| Bis(trimethoxysilylpropyl)amine | | 0.08 | | |
| Tris [3-(trimethoxysilyl)propyl] isocyanurate | | | 0.15 | 0.15 |

Tyzor® PITA SM is a blend of Diisopropoxy-bisethylacetoacetatotitanate in methyl trimethoxy silane (80/20 wt. ratio) and is commercially available from Dorf Ketal Chemicals, LLC. In example 5 above the stabilizing/neutralising agent relied upon is the fumed silica which is naturally mildly acidic however, in this instance for the continuous process it was preferred to introduce condensation cure catalyst and adhesion promoter (when present) before introducing the fillers. For the avoidance of doubt Dimethylbis (N-ethylacetamido)silane is a chain-extender.

To generate the one-part, organopolysiloxane elastomer composition utilising the product of the alkoxy end-capping reaction above, the following further steps were undertaken:—

5) the condensation cure catalyst and adhesion promoter (s) were premixed to form a mixture 2;
6) Once step 4 (above) was completed the mixture 2 was introduced into the mixer and everything was mixed for a further 5 minutes;
7) the fillers were then added. These were calcium carbonate(s) in Ex. 4 and Comparative examples 2 and 3 but in the case of Ex. 5 fumed silica was added in combination with the calcium carbonate and its acidic nature was relied upon to neutralise and stabilize the TBD end-capping catalyst from the alkoxy end capping process; The fillers were added gradually into the pot;
8) After the filler was thoroughly mixed then add hexamethyldisilazane was added; and
9) the composition was then further mixed under vacuum for 10 min after which the final one-part, organopolysiloxane elastomer compositions was packaged.

The final one-part, organopolysiloxane elastomer compositions prepared by the above processes were then assessed for their general physical properties, initially, after 2 weeks of aging at 50° C. and after 4 weeks of aging at 50° C. with the results depicted in Tables 4a, 4b and 4c respectively.

TABLE 4a

General assessment of physical properties in the absence of aging

| General properties | Comp. Ex. 2 | Ex. 4 | Comp. Ex. 3 | Ex. 5 |
|---|---|---|---|---|
| TFT, min (ASTM C679-15) | 28 | 25 | 18 | 60 |
| Flow, mm (ASTM D2202 - 00(2019)) | 2 | 3 | 5.5 | 7 |
| Extrusion Rate, g/min (ASTM C1183-04) | 146 | 130 | 219 | 237 |
| Tensile, MPa (ASTM D412-98a(2002)e1) | 1.97 | 1.37 | 1.99 | 1.32 |
| Duro, shore A (ASTM C661-15) | 28.7 | 37.45 | 23.7 | 28.65 |

TABLE 4b

General assessment of physical properties after 2 weeks of aging at 50° C.

| Aging 50° C. | Comp. Ex. 2 | Ex. 4 | Comp. Ex. 3 | Ex. 5 |
|---|---|---|---|---|
| TFT, min (ASTM C679-15) | Not cure | >60 | Not cure | 37 |
| Extrusion Rate, g/min (ASTM C1183-04) | 781 | 156 | 294 | 228 |
| Tensile, MPa (ASTM D412-98a(2002)e1) | / | 1.71 | / | 1.20 |
| Duro, shore A (ASTM C661-15) | / | 27.15 | / | 27.85 |

TABLE 4c

General assessment of physical properties after 4 weeks of aging at 50° C.

| Aging 50° C. | Comp. Ex. 2 | Ex. 4 | Comp. Ex. 3 | Ex. 5 |
|---|---|---|---|---|
| TFT, min (ASTM C679-15) | Not Cure | >80 | Not cure | 43 |
| Extrusion Rate, g/min (ASTM C1183-04) | / | 258 | / | 230 |
| Tensile, MPa (ASTM D412-98a(2002)e1) | / | 1.62 | / | 1.2 |
| Elongation (%)(ASTM D412-98a(2002)e1) | / | 393 | / | 474 |
| Duro, shore A (ASTM C661-15) | / | 26.35 | / | 27 |

As seen from Tables 4a, 4b and 4c, with 0.1% or higher of oleic acid or in the case of Ex. 5 fumed silica as neutralising agent/stability agent in a one-part, organopolysiloxane elastomer composition per examples 4 and 5 the small amount of acidic neutralising agent/stabilizing agent added after completion of the alkoxy end-capping reactions, a stable one-part, organopolysiloxane elastomer composition was evident in the case of Examples 4 and 5 with a pretty good shelf life. While the comparative examples showed very poor shelf life. After 50° C. aging for 2 weeks, the extrusion rate increased significantly and the sample couldn't cure anymore.

What is claimed is:

1. A process for preparing an alkoxy-terminated polydiorganosiloxane from a silanol-terminated polydiorganosiloxane starting material, the process comprising:

step (i) reacting the silanol-terminated polydiorganosiloxane starting material with one or more polyalkoxy silane starting material(s) of the structure;

$(R^2—O)_{(4-b)}—Si—R^1_b$ where b is 0, 1 or 2, $R^2$ is an alkyl group having from 1 to 15 carbons, and $R^1$ is an optionally functionalized monovalent hydrocarbon radical;

in the presence of a basic end-capping catalyst starting material; and step (ii) adding an acidic stabilizing/neutralising agent selected from:

one or more fatty acids having from 8 to 26 carbons;

an alkane sulphonic acid having from 1 to 10 carbons;

acidic fumed silica; and/or one or more acidic liquid polybutadienes; or a mixture thereof;

wherein the basic end-capping catalyst consists of one or more linear, branched or cyclic molecules comprising at least one amidine group, guanidine group, or derivatives of the amidine group and/or guanidine group or a mixture thereof in an amount of from 0.0005 to 0.75 wt. % of the starting materials composition.

2. The process for preparing an alkoxy-terminated polydiorganosiloxane in accordance with claim 1, wherein $R^1$:

i) is an alkyl group having from 1 to 15 carbons; or ii) is selected from cycloalkyl groups, alkenyl groups, aryl groups, aralkyl groups, aminoalkyl groups, (meth)acrylate groups, glycidyl ether groups and groups obtained by replacing all or part of the hydrogen in the preceding organic groups with halogen.

3. The process for preparing an alkoxy-terminated polydiorganosiloxane in accordance with claim 1, wherein the amidine or guanidine group(s) in the end-capping catalyst are selected from silicon containing molecules or organic molecules containing one of the groups (1) to (4) depicted below:

(1)

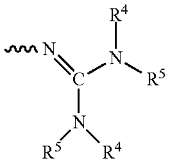

(2)

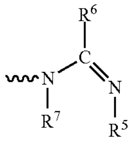

(3)

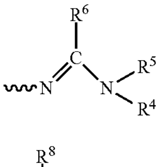

(4)

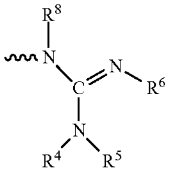

wherein each $R^4$, $R^5$, $R^6$, $R^7$ and $R^8$ is the same or different and is selected from hydrogen, an alkyl group, a cycloalkyl group, a phenyl group, an aralkyl group or alternatively $R^4$ and $R^5$ or $R^6$ and $R^5$ or $R^7$ and $R^5$ or $R^8$ and $R^4$ may form an optionally heterogeneously substituted alkylene group to form a ring structure, wherein the heterogeneous substitution is by means of an oxygen or nitrogen atom.

4. The process for preparing an alkoxy-terminated polydiorganosiloxane in accordance with claim 1, wherein the end-capping catalyst is selected from 1,1,3,3-tetramethylguanidine, 2-[3-(trimethoxysilyl) propyl]-1,1,3,3-tetramethylguanidine, 2-[3-(methyldimethoxysilyl) propyl]-1,1,3,3-tetramethylguanidine, triazabicyclodecene (1,5,7-triazabicyclo[4.4.0]dec-5-ene), 7-methyl-1,5,7-triazabicyclo[4.4.0]dec-5-ene, 1,5-diazabicyclo[4.3.0]non-5-ene, and/or 1,8-diazabicyclo[5.4.0]undec-7-ene.

5. The process for preparing an alkoxy-terminated polydiorganosiloxane in accordance with claim 1, wherein the acidic stabilizing/neutralising agent is selected from:

one or more fatty acids having from 10 to 20 carbons;

an alkane sulphonic acid having from 1 to 10 carbons;

acidic fumed silica; and/or one or more acidic liquid polybutadienes having anhydride groups randomly distributed along the polymer chains; or a mixture thereof.

6. The process for preparing an alkoxy-terminated polydiorganosiloxane in accordance with claim 1, wherein the acidic stabilizing/neutralising agent is selected from oleic acid, acidic fumed silica, an acidic liquid polybutadiene having succinic anhydride groups randomly distributed along the polymer chains, or a mixture thereof.

7. The process for preparing an alkoxy-terminated polydiorganosiloxane in accordance with claim 1, wherein the acidic fumed silica of the acidic stabilizing/neutralising agent is utilized and is pre-treated to render it hydrophobic prior to addition.

8. The process for preparing an alkoxy-terminated polydiorganosiloxane in accordance with claim 1, wherein after adding the acidic stabilizing/neutralising agent, the alkoxy-terminated polydiorganosiloxane final product is stored for a period of up to 12 months prior to use.

9. The process for preparing an alkoxy-terminated polydiorganosiloxane in accordance with claim 1, wherein the one or more polyalkoxy silane(s) are provided in excess such that unreacted polyalkoxy silane is available to function as a cross-linker when utilised for making an organopolysiloxane elastomer composition.

10. The process for preparing an alkoxy-terminated polydiorganosiloxane in accordance with claim 1, wherein the alkoxy-terminated polydiorganosiloxane is subsequently used as an ingredient in an organopolysiloxane elastomer composition by mixing the following ingredients:

(a) the alkoxy-terminated polydiorganosiloxane end-product prepared in accordance with the preceding process;

(b) filler;

(d) a condensation cure catalyst; and optionally (c) cross-linker; and/or (e) adhesion promoter.

11. The process for preparing an alkoxy-terminated polydiorganosiloxane in accordance with claim 1, wherein step (ii) takes place after step (i) with the acidic stabilizing/neutralising agent being added to an alkoxy-terminated polydiorganosiloxane polymer reaction end-product in an amount of from 0.05 to 2.5 wt. % of the starting materials.

12. The process for preparing an alkoxy-terminated polydiorganosiloxane in accordance with claim 10, wherein step (ii) takes place during the preparation of the organopolysiloxane elastomer composition with the acidic stabilizing/neutralising agent being added in an amount of from 0.05 to 2.5 wt. % of the starting materials.

13. An alkoxy end-capped, polydiorganosiloxane polymer obtainable or obtained from the process of claim 1.

14. An organopolysiloxane elastomer composition obtainable or obtained from the process of claim 10.

15. A silicone elastomer which is the reaction product obtained by curing the organopolysiloxane elastomer composition prepared in accordance with claim 10.

16. An alkoxy-terminated polydiorganosiloxane prepared in accordance with the process of claim 1, present in a sealant used in at least one façade, insulated glass, window construction, automotive, solar, or construction application.

17. A process for preparing an alkoxy-terminated polydiorganosiloxane from a silanol-terminated polydiorganosiloxane starting material, the process comprising:

step (i) reacting the silanol-terminated polydiorganosiloxane starting material with one or more polyalkoxy silane starting material(s) of the structure:

$$(R^2—O)_{(4-b)}—Si—R^1_b$$

where b is 0, 1 or 2, $R^2$ is an alkyl group having from 1 to 15 carbons, and $R^1$ is an optionally functionalized monovalent hydrocarbon radical;

in the presence of a basic end-capping catalyst starting material; and step (ii) adding an acidic stabilizing/neutralising agent selected from:

one or more fatty acids having from 8 to 26 carbons;

an alkane sulphonic acid having from 1 to 10 carbons;

acidic fumed silica; and/or one or more acidic liquid polybutadienes; or a mixture thereof;

wherein the end-capping catalyst is selected from 1,1,3,3-tetramethylguanidine, 2-[3-(trimethoxysilyl) propyl]-1,1,3,3-tetramethylguanidine, 2-[3-(methyldimethoxysilyl) propyl]-1,1,3,3-tetramethylguanidine, triazabicyclodecene (1,5,7-triazabicyclo[4.4.0]dec-5-ene), 7-methyl-1,5,7-triazabicyclo[4.4.0]dec-5-ene, 1,5-diazabicyclo[4.3.0]non-5-ene, and/or 1,8-diazabicyclo[5.4.0]undec-7-ene.

18. The process for preparing an alkoxy-terminated polydiorganosiloxane in accordance with claim 17, wherein $R^1$:

i) is an alkyl group having from 1 to 15 carbons; or ii) is selected from cycloalkyl groups, alkenyl groups, aryl groups, aralkyl groups, aminoalkyl groups, (meth)acrylate groups, glycidyl ether groups and groups obtained by replacing all or part of the hydrogen in the preceding organic groups with halogen.

19. A process for preparing an alkoxy-terminated polydiorganosiloxane from a silanol-terminated polydiorganosiloxane starting material, the process comprising:

step (i) reacting the silanol-terminated polydiorganosiloxane starting material with one or more polyalkoxy silane starting material(s) of the structure:

$$(R^2—O)_{(4-b)}—Si—R^1_b$$

where b is 0, 1 or 2, $R^2$ is an alkyl group having from 1 to 15 carbons, and $R^1$ is an optionally functionalized monovalent hydrocarbon radical;

in the presence of a basic end-capping catalyst starting material; and step (ii) adding an acidic stabilizing/neutralising agent selected from:

one or more fatty acids having from 8 to 26 carbons;

an alkane sulphonic acid having from 1 to 10 carbons;

acidic fumed silica; and/or one or more acidic liquid polybutadienes; or a mixture thereof;

wherein the one or more polyalkoxy silane(s) are provided in excess such that unreacted polyalkoxy silane is available to function as a cross-linker when utilised for making an organopolysiloxane elastomer composition.

20. The process for preparing an alkoxy-terminated polydiorganosiloxane in accordance with claim 19, wherein $R^1$:

i) is an alkyl group having from 1 to 15 carbons; or ii) is selected from cycloalkyl groups, alkenyl groups, aryl groups, aralkyl groups, aminoalkyl groups, (meth)acrylate groups, glycidyl ether groups and groups obtained by replacing all or part of the hydrogen in the preceding organic groups with halogen.

* * * * *